United States Patent

[11] 3,617,507

| [72] | Inventors | Willi Oettinger;<br>Walter Saum; Rolf Seubert, all of<br>Ludwigshafen, Germany |
|---|---|---|
| [21] | Appl. No. | 798,453 |
| [22] | Filed | Feb. 11, 1969 |
| [45] | Patented | Nov. 2, 1971 |
| [73] | Assignee | Badische Anilin- & Soda-Fabrik<br>Aktiengesellschaft<br>Ludwigshafen, Rhine, Germany |
| [32] | Priorities | Feb. 17, 1968 |
| [33] | | Germany |
| [31] | | P 16 42 952.0;<br>Feb. 17, 1968, Germany, No. P 16 45 711.7 |

[54] PROCESS FOR HYDROCRACKING HEAVY HYDROCARBONS
5 Claims, No Drawings

[52] U.S. Cl. .................................................. 208/111, 252/455 Z
[51] Int. Cl. .................................................. C10g 13/04, C01b 33/28, B01j 11/54

[50] Field of Search ........................ 208/110

[56] References Cited
UNITED STATES PATENTS

| 3,267,022 | 8/1966 | Hansford | 208/111 |
| 3,272,734 | 9/1966 | MacLaren | 208/110 |
| 3,304,254 | 2/1967 | Eastwood et al. | 208/111 |
| 3,384,572 | 5/1968 | Myers et al. | 208/111 |
| 3,450,626 | 6/1969 | Wight et al. | 208/110 |

*Primary Examiner*—Delbert E. Gantz
*Assistant Examiner*—G. E. Schmitkons
*Attorney*—Johnston, Root, O'Keeffe, Keil, Thompson & Shurtleff

ABSTRACT: A hydrocarbon conversion catalyst consisting essentially of nickel and/or molybdenum and a carrier comprising a crystalline zeolite and a mixture or compound of alumina and magnesia, and the hydrocracking process using this catalyst and heavy hydrocarbon feedstocks in the form of crude oils, shale oils, residual oils and distillates thereof.

PROCESS FOR HYDROCRACKING HEAVY HYDROCARBONS

It is known that heat resistant compositions containing crystalline zeolites, with or without the addition of catalytically active metals or metal compounds, may be used as catalysts for hydrocarbon conversions such as alkylation, dealkylation of alkylaromatics, isomerizations, hydrofining, catalytic cracking and reforming.

Catalyst compositions and carriers are known for these hydrocarbon conversions which consist exclusively of crystalline zeolites or which contain nonzeolitic aluminum silicates or aluminas as well as crystalline zeolites.

These catalyst compositions and carriers are distinguished by very good properties for the said hydrocarbon conversion processes.

It is also known that hydrocracking of high boiling point hydrocarbons can be carried out in the presence of catalysts which comprise metals or metal compounds having a catalytic action supported on a crystalline zeolite.

It is further known that hydrocracking may be carried out in the presence of catalysts containing metals or metal compounds whose carrier consists of a crystalline zeolite which is distributed in an aluminum silicate or alumina which has been prepared from a sol.

These catalysts are distinguished by good cracking activity but in many cases the desired distribution of cracked products is not achieved in the hydrocracking. Another disadvantage of these catalysts is their fairly low hydrogenating action.

In processing asphaltic starting material over pure zeolite supported catalysts, moreover, the asphalt constituents undergo little or no degradation in a single passage of the feed. When processing the same feed over a catalyst which contains (as carrier) not only a crystalline zeolite but also a nonzeolitic aluminum silicate, a major amount of gasoline and only very little middle distillate is obtained, but a very large amount of unchanged residue boiling in the range of the feed remains.

When a feedstock containing asphalt is processed over a zeolite alumina supported catalyst, cracking to gasoline is considerably lessened, although more middle distillate is obtained. In this case also a large residue boiling in the range of the feedstock remains.

It is the object of this invention to prepare still further improved catalyst carriers or compositions containing crystalline zeolites which in particular have increased cracking activity.

Another object of the invention is to provide a hydrocracking process using the said catalysts.

These objects are achieved with the hydrocarbon conversion catalysts according to the invention which contain from 0.2 to 35 percent by weight of at least one of nickel and molybdenum on a solid acid carrier which contains in intimate mixture from 10 to 90 percent by weight of a crystalline zeolite having a silica:alumina ratio in the range of 1 to 6 and whose alkali metal cation has been removed to the extent of at least 30 percent, and from 90 to 10 percent by weight of aluminum oxide and magnesium oxide in the ratio of the oxides of from 1:10 to 10:1.

The term "crystalline zeolite" is used in the present specification to denote a natural or synthetic crystalline alkali metal aluminum silicate in which the molar ratio of $SiO_2$ to $Al_2O_3$ may be from 1 to 6 or more (cf. for example "Proceedings of the Sixth World Petroleum Congress," Section III, pages 115 et seq.).

The pore opening in the zeolite generally increases as the molar ratio of $SiO_2$ to $Al_2O_3$ increases. Zeolites having low $SiO_2:Al_2O_3$ ratios, for example from 1 to 2.5 may be used for conversion reactions with low molecular weight hydrocarbons. When hydrocarbons having higher molecular weight are used in the conversion reaction, it is advantageous to use zeolites having a higher $SiO_2:Al_2O_3$ ratio, for example of from 2.4 to 5.

The catalyst composed of crystalline zeolite and a mixture or compound of oxides of magnesium and aluminum may contain from 10 to 90 percent by weight, advantageously from 20 to 80 percent by weight, particularly from 50 to 70 percent by weight, of the crystalline zeolite.

The ratio by weight of magnesia to alumina may be from 1:10 to 10:1, particularly from 1:4 to 4:1. A preferred ratio is about 1 mole of magnesium oxide to about 1 mole of aluminum oxide, i.e. about in the ratio of the components in a spinel.

The oxides may be mixed mechanically, for example by grinding. The mixture of oxides may however be prepared by precipitation from aqueous solutions of salts of magnesium and aluminum. It is also possible to precipitate only one component (for example magnesium oxide) onto the other component (aluminum oxide).

Chlorides, nitrates, acetates or sulfates may be used for example as the salts of aluminum and magnesium from which the mixed oxides are precipitated. Ammonia is particularly suitable as precipitant. It is advantageous to precipitate the oxides from a solution of the salts at elevated temperature, for example at from 40° to 90° C.

According to one embodiment of the invention, the mixture of magnesium oxide and aluminum oxide or the mixed oxides of aluminum and magnesium (which may if desired contain further magnesium oxide and/or aluminum oxide) are mixed intimately with the crystalline zeolite. Mixing may be carried out in the usual way, for example by grinding the substances in a ball mill.

In another method of making the catalyst carrier, the crystalline zeolite may be mixed with the still moist paste of the oxides of magnesium and aluminum or the still moist paste of the mixed oxides of aluminum and magnesium (which may contain further magnesium oxide and/or aluminum oxide). The mixture is then dried, shaped and calcined.

Since the catalyst carrier according to the invention should contain as little alkali as possible, the alkali content of the crystalline zeolite (originally present as alkali metal aluminum silicate) is decreased by cation exchange. This may be done prior to the mixing of the zeolite with the oxide mixture or after such mixing.

Inorganic salts, for example soluble compounds of silver, copper, calcium, magnesium, cadmium, ammonium, chromium, vanadium, iron, nickel, cobalt, manganese or zinc and also compounds of precious metals or rare earths are generally used for exchange of the alkali metal ions of the zeolite for other cations. Mixtures of solutions of different salts may also be used.

As a rule the alkali metal of the crystalline zeolite is exchanged to the extent of up to 95 percent, preferably up to 90 percent. It has proved to be advantageous for at least 30 percent, advantageously 45 percent, of the alkali metal content to be replaced by the said cations.

Depending on the intended use, catalytically active metals and/or metal compounds may be applied to the catalyst carriers thus prepared.

Application of the catalytically active metal and/or compound may be carried out during the production of the mixture of zeolite with the oxides of aluminum and magnesium. Thus the catalytically active metal or metal compound may be mixed with the still moist composition of the mixture of zeolite with the oxides of aluminum and magnesium.

Soluble salts of catalytically active metals may also be used for exchanging the alkali metal ions of the zeolite. The salts of iron, cobalt, nickel, chromium, manganese, copper, silver and the precious metals are particularly suitable for this purpose.

Application of the catalytically active metals and/or metal compounds may also be carried out by preparing a paste of the oxides and/or mixed oxides of aluminum and magnesium with the whole of the catalytically active metals and/or metal compounds, adding the cation-exchanged zeolite, drying, shaping and calcining.

The catalytically active metals and/or metal compounds should as a rule amount to from 0.2 to 35 percent by weight of the finished catalyst in the catalysts according to this invention, which are particularly suitable for hydrocracking.

The catalysts according to the invention are particularly suitable for hydrocracking, i.e. hydrogenating cracking of hydrocarbons within known limits of temperature, pressure, amount of hydrogen and space velocity. This usually involves the treatment of crude oils, shale oils, crude oil residues and their distillation products and conversion products with hydrogen or gas containing hydrogen at temperatures of from 250° to 480° C. and at a pressure of from about 50 to 300 atmospheres. The feedstock is used in amounts of from 0.2 to 5 kg. per liter of catalyst per hour. The amount of hydrogen supplied to the reactor is between 150 and 5000 liters per kilogram of hydrocarbon to be converted per hour.

Catalysts which are suitable for hydrocracking may have a molar ratio of $SiO_2:Al_2O_3$ in the crystalline zeolites of from 1:1 to 5:1. Since the pore opening in the zeolites increases with increasing $SiO_2:Al_2O_3$ molar ratio, zeolites having a molar ratio of $SiO_2:Al_2O_3$ of more than 2:1, especially more than 2.4:1, particularly 2.7:1 to 6:1, are preferred for hydrocracking high-boiling hydrocarbons. If low-boiling hydrocarbons such as light naphtha and naphtha are to be hydrocracked, crystalline zeolites having a molar ratio of $SiO_2:Al_2O_3$ of down to 1:1 may also be used.

Metals and/or metal compounds having catalytic activity are added in known manner by mixing or impregnation to the carrier consisting of crystalline zeolite and magnesium oxide and aluminum oxide for preparation of the catalysts suitable for hydrocracking. Metals and metal compounds of subgroups 5 and 6 and of group 8 of the Periodic System are suitable. Examples of suitable metals are nickel and/or molybdenum. The finished catalyst may contain one or more than one of these catalytically active metals or metal compounds.

EXAMPLE I

The following catalysts (which contain molybdenum oxide on the carriers given under (1) to (5)) are compared for hydrocracking:
1. zeolite
2. zeolite + aluminum silicate
3. zeolite + alumina
4. zeolite + magnesium/aluminum spinel
5. zeolite + magnesium oxide/aluminum oxide (20 percent of magnesium oxide).

For the preparation of these catalysts, a crystalline zeolite having a ratio of $SiO_2:Al_2O_3$ of 4.9:1 and a lattice constant of 24.66 A is treated twice, each time with a 10 percent solution of cerium chloride which contains 2 percent of ammonium chloride at 80° C. for 12 hours. The sodium content of the zeolite is then 1.6 percent.

Ammonium molybdate solution is added to some of the moist paste so that after drying, shaping and calcination, the finished catalyst contains 7 percent of molybdenum oxide. Other portions of the moist zeolite paste are mixed with amorphous aluminum silicate (75 percent of $SiO_2$), gamma-aluminum oxide, magnesium oxide/aluminum oxide spinel or magnesium oxide/aluminum oxide (20 percent magnesium oxide).

The amounts are chosen so that in the finished dried carrier in each case 70 percent of zeolite and 30 percent of amorphous carrier material are present. The carrier is also treated with such an amount of ammonium molybdate solution that after the catalyst has been dried, shaped and calcined it contains 7 percent of molybdenum oxide.

A residue, boiling above 360° C., from a Near Eastern crude oil having a specific gravity at 70° C. of 0.954, 4.3 percent of sulfur, 10.8 percent of hydrogen, 3.6 percent of asphalt, 12.2 percent of Conradson carbon (all by weight), 62 p.p.m. of vanadium and 20 p.p.m. of nickel is passed under the conditions specified in the following table over 100 c.c.m. of one of the five catalysts in a pressure tube which is electrically heated externally. The results given below are obtained.

The superiority of the catalysts to be used according to this invention may be clearly seen from these comparative experiments; as may be seen from the final column in the table, these catalysts have a very high cracking activity. The product consists to the extent of more than 45 percent by weight of gasoline boiling at up to 185° C.; a large amount of middle distillate is also obtained. The residue boiling above 350° C. and in the boiling range of the feedstock is only 36.5 percent or 38.6 percent by weight, i.e. considerably less than in the comparative tests, with an adequate degradation of asphalt. When a catalyst having a pure zeolitic carrier is used according to the first column in the table, even an increase in the content of asphalt in the residue is observed.

TABLE

| Catalyst: $MoO_3$ on: | 1 | 2 | 3 | 4 | 5 |
|---|---|---|---|---|---|
| Experimental conditions: | | | | | |
| Pressure (atmospheres) | 210 | 210 | 210 | 210 | 210 |
| Temperature °C. | 424 | 420 | 420 | 420 | 420 |
| Throughput kg/l/h | 0.5 | 0.5 | 0.5 | 0.5 | 0.5 |
| m³ of gas/kg of oil | 2.5 | 2.5 | 2.5 | 2.5 | 2.5 |
| Properties of cracked products: | | | | | |
| % by weight boiling at up to 185° C. | 45.7 | 49.6 | 29.2 | 48.4 | 45.6 |
| % by weight boiling at 185° to 350° C. | 6.1 | 7.4 | 25.6 | 15.1 | 15.8 |
| % by weight boiling at more than 350° C. | 48.2 | 43.0 | 45.2 | 36.5 | 38.6 |
| % of asphalt therein | 5.3 | 3.4 | 2.1 | 3.1 | 2.9 |

We claim:

1. In a process for hydrocracking an asphaltic heavy hydrocarbon crude oil residue at temperatures ranging from 250° and 480° C., pressures ranging from 50 to 300 atmospheres, hourly space velocities ranging from 0.2 to 5 kg. per liter of catalyst and a hydrogen throughput of 150 to 5000 liters per kilogram of oil in the presence of a catalyst containing at least one metal selected from the group consisting of the metals of Groups VIB and VIII of the Periodic Table applied to a solid acidic support, said support comprising an alkali-ion-exchanged zeolite distributed in a matrix of inorganic oxides, the improvement which comprises contacting an asphaltic heavy hydrocarbon residue, boiling above 360° C., in the presence of hydrogen with a catalyst comprising a metal component selected from the group consisting of nickel and molybdenum, and both nickel and molybdenum and deposited in an amount of from 5 to 25 percent by weight on a solid acidic support which is an intimate mixture 10 to 90 percent by weight of a crystalline zeolite which has a silica/alumina molar ratio of from 2.7:1 to 6:1 and whose alkali cations have been removed to the extent of at least 30 percent, and from 90 to 10 percent of alumina and magnesia, the ratio of said oxides being from 1:10 to 10:1.

2. A process according to claim 1 wherein the alumina and magnesia are present as a physical mixture thereof.

3. A process according to claim 1 wherein the alumina and magnesia are derived by coprecipitation of salts thereof and calcination.

4. A process according to claim 1 wherein the alumina and magnesia ratio is in the range of from 1:4 to 4:1.

5. A process according to claim 1, wherein the alumina and magnesia constitute a spinel.

* * * * *